United States Patent [19]

Shimabukuro

[11] Patent Number: 5,578,338

[45] Date of Patent: Nov. 26, 1996

[54] PROCESS FOR PRODUCTION OF EUCALYPTUS TEA

[75] Inventor: Kenji Shimabukuro, Nago, Japan

[73] Assignee: Yugen Kaisha Okinawa Yukali Farm, Okinana, Japan

[21] Appl. No.: 470,067

[22] Filed: Jun. 6, 1995

Related U.S. Application Data

[63] Continuation-in-part of Ser. No. 396,690, Mar. 1, 1995, and a continuation-in-part of Ser. No. 104,826, Aug. 10, 1993, abandoned.

[51] Int. Cl.$^6$ ............................................. A23F 3/12
[52] U.S. Cl. .......................... 426/597; 426/435; 426/456; 426/457; 426/511
[58] Field of Search ............................. 426/435, 597, 426/456, 457, 511

[56] References Cited

PUBLICATIONS

Dialog Data Base, File 51 (FSTA), Dialog Acc. No. 00329576 Abstracting USSR Patent 1,202,540A, 1986.
Dialog Data Base, File 351 (WPI) Dialog Acc. No. 009472497, Abstracting SU 1738212, Jun. 7, 1992.
Dialog Data Base, File 351 (WPI) Dialog Acc No. 004700443 Abstracting SU 1,202,540, Jan. 7, 1986.
STN Database, File Caplus, STN Acc. No. 1990:457886 Abstracting Linchen Huaxe Yu Gongye, 1989. 9(4) pp. 49–54.
J. Lust. The Herb Book, 1974. Benedict Lust Pubications. New York. p. 180.

*Primary Examiner*—Anthony J. Weier
*Attorney, Agent, or Firm*—McGlew And Tuttle

[57] ABSTRACT

A Eucalyptus tea which is prepared by steaming, rumple-twisting and drying Eucalyptus material, especially leaves, contains a large amount of soluble polysaccharides and tannins, and further richly contains inorganic components such as potassium, sodium and calcium. Also, a process is provided for producing Eucalyptus tea made from stem, leaf and/or bark portions, especially leaves, of the Eucalyptus.

7 Claims, 2 Drawing Sheets

FIGURE 1: The change on density of gross cholesterol in blood plasma with diabetic rats.

an experimental rat: age of four weeks, descendant of wister, dosed Storeptozotocin (60mg/kg weight)

FIGURE 2: The change on the blood sugar level with diabetic rats.

an experimental rat: age of four weeks, male, descendant of wister, dosed Storeptozotocin (60mg/kg weight)

PROCESS FOR PRODUCTION OF EUCALYPTUS TEA

CROSS REFERENCE TO RELATED APPLICATION

This is a continuation-in-part application of application Ser. No. 08/396,690 filed Mar. 1, 1995 and a continuation in part of U.S. application Ser. No. 08/104,826 filed Aug. 10, 1993, now abandoned.

BACKGROUND OF THE INVENTION

1. Field of the Invention

The present invention relates to tea made solely, i.e. exclusively, from Eucalyptus (Eucaly) stem, leaf and/or bark portions, especially leaves, and which richly contains aroma and nutrients.

The present invention further relates to a process for producing Eucalyptus tea made solely from stem and/or leaf and/or bark portions, especially leaves, of the Eucalyptus:
ROBSTA EUCALYPTUS (EUCALYPTUS ROBSTA SMITH) and
LEMON EUCALYPTUS (EUCALYPTUS CITRI-ODORA HOOK).

2. Description of the Prior Art

As tea made from leaves other than green tea leaves, there are well known, for example, Wulung tea, Gymnema tea, Silvervine tea, Ashitaba tea, Olive tea, and Saururaceous tea.

Although such teas contain plenty of vitamins, they contain less in the way of tannic components known as mixtures of catechins, which have been reported to have various effects such as a beneficial effect on intestinal disorder, a controlling effect on absorption of glucides from the intestine, a controlling effect in the production of glucides having an excretion accelerative action on cholesterol and lipids giving lesions to living tissues and organs (i.e., an antioxidizing action), an antimutagenicity, an anticancer action, a controlling action on hypercholesterol, an antihypertensive action and an antibacterial action.

It is believed that the raw leaves of the Eucalyptus (Eucaly), which is an evergreen tree and which is grown in Australia and other countries, are currently only used as a feed for koala bears.

However, the essential oil produced from the Eucalyptus has been put to practical use for candies or cough drops for curing sore throats. In addition to such use, the essential oil produced from the Eucalyptus has conventionally exerted effects for achieving certain medical purposes, such as antidotal effects, sedation, fatigue-recovery, promotion of appetite and digestion, prevention of intestinal disorders, deworming, and the like. It has also been discovered recently that it is effective in curing diabetes. Furthermore, the essential oil produced from the Eucalyptus is known to remove phlegm so as to soothe the symptoms of bronchitis and asthma.

Moreover, it has been reported that the Eucalyptus contains various components which serve the function of medicines. For example, in case of bleeding due to external injuries, Eucalyptus leaves can serve as a hemostatic such that they are applied to the wound so as to stop bleeding, and they can also be effectively used for first aid treatment for burns. Thus, the Eucalyptus is also used for external application.

Although Eucalyptus is conventionally only used as a raw feed for koala bears, it may also be applied in ran or unprocessed form to healthy refreshing drinks and be widely used for health foods since it exerts pronounced medical effects. However, raw or unprocessed Eucalyptus has a characteristic strong raw smell and thus is not suitable for table luxury foods, i.e. for fine foods.

In particular, "The Herb Book" by John B. Lust (Lust), 1st ed 1974, Benedict Lust Publications, p. 180, indicates that Eucalyptus globulus, common name: Blue gum, is useful as an antiseptic, deodorant, expectorant and stimulant. Most Eucalyptus medications are made from the greenish-yellow oil obtained from the mature leaves. The oil, or lozenges and cough drops made from it, is useful for lung diseases, colds and sore throats. The oil is also useful as a vapor bath for asthma and other respiratory ailments, as an antiseptic bath additive, and for pyorrhea and for burns, to prevent infection, and its expectorant properties are useful for bronchitis.

Lust indicates that a cold extract made from the leaves is usable for indigestion and for intermittent fever, while the antiseptic and deodorant qualities of the oil make it suitable for use on pulverulent wounds and ulcers. The oil is prepared by boiling the mature leaves in water and condensing the vapor to recover the oil.

Dialog Data Base, File 51 (FSTA), Dialog Acc. No. 00329576, is an abstract of USSR Patent 1,202,540A, 1986 (Dragvelidze, N. I. et al), concerning a method of producing a tea substitute, involving comminuting bilberry leaves, curling, fermentation and drying. To improve the organoleptic characteristics and therapeutic properties of the tea substitute, the leaves are preliminarily withered to 60–62% moisture content before processing. Comminuted leaves of Cornelian charry and Eucalyptus are added to the bilberry leaves in defined proportions at the curling stage with subsequent double curling and grading, thereby forming a mixed product.

Dialog Data Base, File 351 (WPI), Dialog Acc. No. 009472497, is an abstract of SU 17382.12, Jun. 7, 1992 (Dzhikiya, M. D. et al), concerning a green tea production in which the original tea is roasted, minced, thermally aged and other materials, e.g. laurel or Eucalyptus, are added in two stages, with streaming. The tea is roasted, minced, thermally aged with fermentation, vegetable additives are introduced, and the resulting mixture dried, steamed, and pressed, with fine drying, the vegetable additives actually being included in two stages: (a) after roasting with a ratio of additives to mass of 10–20:100, and (b) after steaming with a ratio of additives to mass of 5–10:100. After drying, the constituents are mixed together, thereby forming a mixed product.

Dialog Data Base, File 351 (WPI), Dialog Acc. No. 004700443, is an abstract of SU 1,202,540, Jan. 7, 1986 (Dragvelidze, N. I. et al), concerning a caffeine-free tea substitute obtained from leaves of bilberry, dogwood and Eucalyptus, and made from shredded bilberry leaves, which are rolled, fermented and dried. The organoleptic and medical properties of the tea are improved as follows: the bilberry leaves are dry cured to a residual moisture content of 60–62% and at the rolling stage shredded leaves from dogwood and Eucalyptus are added in the ratio of 80–90:18–8:1–2, and the blend is subjected to 2-stage rolling and screening.

Typically, per this teaching, 80 kg bilberry leaves are dehumidified at 40° C. to 62% moisture content, then shredded, and 18 kg dogwood and 1 kg Eucalyptus leaves, each shredded separately, are added to the bilberry leaves. The final blend is rolled for 40 minutes, screened after each rolling, fermented at 26° C. and 95–98% humidity, dried at 100° C. to 5% moisture content, and classified into grades, thereby forming a mixed product.

SUMMARY OF THE INVENTION

An object of the present invention is to provide a tea which contains plenty of fats, soluble polysaccharides and tannins, which furthermore richly contains inorganic components such as potassium, sodium and calcium, and which can be prepared by steaming, rumple-twisting and heat-drying Eucalyptus stems, leaves and/or bark portions, especially leaves.

A further object of the present invention is to provide an improvement in the processing of Eucalyptus in which the characteristic strong raw smell of Eucalyptus is eliminated substantially completely and an aromatic fragrance and sweet flavor peculiar to the Eucalyptus is made stronger and preserved so that the Eucalyptus can be suitably used for table luxury foods, such as Eucalyptus tea.

The various features of novelty which characterize the invention are pointed out with particularity in the claims annexed to and forming a part of this disclosure. For a better understanding of the invention, its operating advantages and specific objects attained by its uses, reference is made no the accompanying drawings and descriptive matter and examples in which preferred embodiments of the invention are illustrated.

DETAILED DESCRIPTION OF THE INVENTION

The tea according to the present invention is made from stems, leaves and/or bark portions, especially leaves, of Robsta Eucalyptus (Eucalyptus Robsta Smith) or Lemon Eucalyptus (Eucalyptus Citriodora Hook), which have been known as a feed for koalas and which are cultured in the Okinawa Islands, Japan.

The tea leaf portion of such Eucalyptus contains plenty of tannic components known as mixtures of lipids (fats), glucides and catechins. Therefore, it can be expected that the essential oil components of Eucalyptus oil extracted from said lipids may exhibit pharmaceutical effects on cold syndromes, diarrhea, enteritis, asthma, rhinitis, and the like. Such effects are also expected to be given by said glucides and tannic components.

In addition, such leaves contain plenty of potassium, calcium and phosphorus. Especially in regard to calcium, the effect of the shortage of intake of calcium has been pointed out recently. Therefore, it is also expected that such tea leaves will have a high contribution in regard to the formation of good (strong) bone.

As to the above noted processing of Eucalyptus, in order to achieve such processing, the present invention further provides a first process or alternatively a second process for producing an Eucalyptus tea product which is made from the stem and/or leaf and/or bark portions, especially the leaves, of Eucalyptus.

The first process generally comprises the steps of:

placing the stem and/or leaf portions and/or bark portions of raw Eucalyptus in a drying place or room (drying zone) and leaving them to dry by themselves (self-drying), steaming the dried Eucalyptus, rubbing the steamed Eucalyptus while it is being compressed, and drying the resultant Eucalyptus by hot air and/or by an open fire (open flame).

Alternatively, the second process generally comprises the steps of:

placing the stem and/or leaf portions and/or bark portions of raw Eucalyptus in a drying place or room (drying zone) and leaving them to dry by themselves (self-drying), rubbing the dried Eucalyptus while it is being compressed, shredding the resultant Eucalyptus, fermenting the shredded Eucalyptus, and drying the fermented Eucalyptus by hot air and/or by an open fire (open flame).

The noted first process is performed more specifically by the following steps. Stem and/or leaf and/or bark portions of Eucalyptus (one or two of them) are placed in a drying space or room (drying zone) and left to dry by themselves (self-drying). When the potential (latent) sweet aromatic fragrance of Eucalyptus is thereby made stronger, i.e. upon sufficient drying, the resultant Eucalyptus is steamed, so that the characteristic strong raw smell is eliminated and activation of attendant enzymes is prevented. Hence, the green color peculiar to the raw leaves and bark of Eucalyptus can be preserved.

Furthermore, the noted second process is performed more specifically by the following steps. Stem and/or leaf and/or bark portions of Eucalyptus (one or two of them) are placed in a drying space or room (drying zone) and left to dry by themselves (self-drying), and are then rubbed while being compressed. The consequent fermentation in progress up to this point is interrupted by heat, thus preserving the inherent aromatic fragrance and delicate flavor peculiar to Eucalyptus tea, and thereby ensuring the production of a good quality of Eucalyptus tea.

Per the present invention, the processed Eucalyptus tea has the sheen or glow of a yellowish-green like or a gold-like color as well as an aromatic fragrance.

According to a first particular production feature, the process contemplates the following sequential steps:

(a) shredding stems and leaves (and bark) of Eucalyptus to form shredded Eucalyptus material, (b) placing the shredded Eucalyptus material in a drying space or room (static drying zone) and leaving it to dry by itself, (c) steaming the dried Eucalyptus material, (d) performing a first rubbing process on the dried Eucalyptus material while it is being compressed, (e) performing a second rubbing process thereon while it is being compressed, (f) performing a third rubbing process thereon it is being compressed, (g) subjecting the so rubbed Eucalyptus material to copper-drum rotation drying under indirect heat, (h) subjecting the drum dried Eucalyptus material to shelf-drying (static drying in a drying zone), (i) subjecting the shelf dried Eucalyptus material to copper-drum rotation drying under direct heat by exposure to an open fire (open flame), and (j) recovering the Eucalyptus tea dry product.

According to a second particular production feature, the process contemplates the following sequential steps:

(aa) shredding stems and leaves (and bark) of Eucalyptus to form shredded Eucalyptus material, (bb) placing the shredded Eucalyptus material in a drying space or room (static drying zone) and leaving it to dry by itself, (cc) subjecting the dried Eucalyptus material to high mechanical squeezing pressure and then further shredding it, (dd) forming the further shredded Eucalyptus material into a pile and allowing it to stand, (ee) allowing the standing Eucalyptus material to undergo fermentation, (ff) interrupting the fermentation by subjecting the Eucalyptus material to copper-drum rotation drying under indirect heat, (gg) subjecting the drum dried Eucalyptus material to shelf-drying (static drying in a drying zone) and interrupting the resultant further fermentation by subjecting the shelf dried Eucalyptus material to copper-drum rotation drying under indirect heat, (hh) subjecting the so dried Eucalyptus material to direct heat drying by exposure to an open fire (open flame), and brewing the so dried Eucalyptus material, and (ii) recovering the resultant Eucalyptus tea liquid product.

According to a third particular production feature, the process contemplates the following sequential steps:

(aaa) shredding stems and leaves (and bark) of Eucalyptus to form shredded Eucalyptus material, (bbb) placing the shredded Eucalyptus material in a drying space or room (static drying zone) and leaving it to dry by itself, (ccc) steaming the dried Eucalyptus material, (ddd) subjecting the steamed Eucalyptus material to drying under high mechanical squeezing pressure, (eee) compressing and further shredding the so dried Eucalyptus material, (fff) subjecting the further shredded Eucalyptus material to copper-drum rotation drying under indirect heat and thereafter to shelf-drying (static drying in a drying zone), (ggg) recovering the so dried Eucalyptus material, (hhh) crushing and comminuting the resultant Eucalyptus material to fine mesh size powder, (iii) brewing the mesh size powder Eucalyptus material to form a brewed Eucalyptus tea liquid, (jjj) sterilizing the brewed Eucalyptus tea liquid, and (kkk) recovering the sterilized Eucalyptus tea liquid product.

EXAMPLES

The following examples are set forth by way of illustration and not limitation of the invention.

The production of the Eucalyptus tea of the present invention can preferably be carried out in the same manner as the production process for green tea, subject to the distinctions of the particular production procedures of the present invention (and their sequence) over the known production process for green tea.

That is, at first, the raw leaves of Robsta Eucalyptus (ohba Yukari as Japanese name; Eucalyptus Robsta Smith as a botanical name) or of Lemon Eucalyptus (Lemon Yukarinoki as Japanese name; Eucalyptus Citriodora Hook as a botanical name) were (1) steamed by using about 100° C. of water vapor for about 30 sec., followed by (2) cooling rapidly. In this procedure, the steaming step not only causes loss of activity of the oxidizing enzymes in the raw tea leaves, but also causes an increase in the softness of the tea leaves to bring out the aromatic components of Eucalyptus tea and to make it easy to rumple-twist and dry the leaves. On the other hand, the cooling step prevents the tea leaves from undergoing color and gloss degradation.

Next, the resulting tea leaves were (3) dried as a pretreatment first step for a more precise rumple-twisting, and then (4) rumple-twisted. The resultant tea leaves were (5) further dried to a moisture content of about 5% or less, in order to give the tea leaves storage stability for a long time (long term storage stability), followed by (6) finely grinding or comminuting the tea leaves to a finely ground tea in dry powder form to enhance the elution of the components therein and to give out (emit) an aroma from the leaves.

The Eucalyptus tea thus obtained was compared with commercially available Gymnema tea and Wulung tea in their contents of general chemical components and inorganic components in dried form. The results are shown in Table 1 below.

TABLE 1

The Contents of General Chemical Components and Inorganic Components in Eucalyptus Tea, Gymnema Tea and Wulung Tea (In Dried Form)

| Component | Eucalyptus Tea | Gymnema Tea | Wulung Tea |
| --- | --- | --- | --- |
| Crude Proteins | 7.6% | 10.2% | 21.1% |
| Crude Fats | 7.4 | 1.6 | 1.8 |
| Ash Content | 5.0 | 8.7 | 5.7 |
| Crude Fibers | 16.8 | 36.6 | 16.5 |
| Glucides | 49.9 | 44.1 | 43.5 |
| Caffeine | ND | 1.2 | 2.0 |
| Tannins | 13.6 | 0.5 | 10.4 |
| Potassium | 1731.3 mg% | 1327.0 mg% | 1366.0 mg% |
| Sodium | 837.4 | 86.2 | 7.4 |
| Calcium | 592.5 | 868.8 | 188.0 |
| Magnesium | 359.0 | 342.0 | 205.0 |
| Phosphorus | 186.7 | 384.8 | 245.0 |
| Iron | 9.5 | 88.4 | 81.0 |
| Copper | 0.5 | 1.4 | 21.0 |
| Zinc | 2.7 | 2.2 | 2.3 |
| Lead | ND | ND | ND |
| Selenium | 0.9 | 1.0 | 7.2 |

ND: Not Detected

As shown in Table 1, the crude proteins, ash and crude fibers contents of the Eucalyptus tea of the present invention are lower than those of the comparative teas, whereas the crude fats, glucides and tannins contents are higher than those of the comparative teas.

In the inorganic components contents, although Gymnema tea shows the highest values in the calcium and iron contents among the tested teas, the Eucalyptus tea of the present invention shows the highest values in the potassium, sodium and zinc contents compared to Gymnema tea and Wulung tea.

Accordingly, the Eucalyptus tea of the present invention can be expected to exhibit pharmaceutical effects, for example, on cold syndrome, diarrhea and enteritis, since it has extremely high contents of fats, glucides and tannins as general chemical components.

In addition, since as much as about 50% of the content is formed of glucides, apart from crude fibers, this leads to the assumption of the existence of a large amount of soluble polysaccharides in the Eucalyptus tea of the present invention, and it is considered that the tea has a beneficial effect on intestinal disorder, a controlling effect on absorption of glucides from the intestine and an accelerative action on excretion of cholesterol, as the biological regulative functions of such polysaccharides.

The Eucalyptus tea of the present invention contains a large amount of tannic components which are the main components of bitter astringent taste known as mixtures of catechins. Therefore, it can be expected that the Eucalyptus tea exhibits various effects such as an effect on intestinal disorders, a controlling effect on the absorption of glucides from the intestine, a controlling effect on the production of lipids giving lesions to, living tissues and organs (i.e., an antioxidizing action), an antimutagenicity, an anticancer action, a controlling action on hypercholesterol, an antihypertensive action and an antibacterial action, which have been particularly noted recently.

As mentioned above, the Eucalyptus tea of the present invention has a specific flavor derived from the essential oil components, contains a large amount of soluble polysaccharides and tannins, and further richly contains inorganic components such as potassium, sodium, calcium and magnesium. Therefore, the Eucalyptus tea of the present invention is very useful for the preservation and improvement of one's health.

In particular, this invention concerns finely ground Eucalyptus tea in dried powder form, constituting a tea powder product made solely, i.e. exclusively, from Eucalyptus stems, leaves and/or bark portions, especially leaves, i.e. solely from Eucalyptus material as distinguished from other type tea material, and by the steps in sequence comprising:

(1) steaming (not boiling nor extracting in the cold or at normal temperature) raw Eucalyptus stems, leaves and/or bark portions, especially leaves, alone, in particular Robsta Eucalyptus or Lemon Eucalyptus, e.g. at about 100° C. for about 30 seconds, to cause loss of activity of attendant oxidizing enzymes therein and also to cause an increase in the softness thereof, especially of the leaves, and thereby forming a steamed Eucalyptus material alone, (2) cooling the resultant steamed Eucalyptus material rapidly to prevent the color and gloss degradation thereof, (3) drying the cooled Eucalyptus material, (4) rumple-twisting the dried Eucalyptus material, (5) further drying the rumple-twisted Eucalyptus material to at most about 5% moisture content to increase the long term storage stability thereof, and (6) grinding the resultant Eucalyptus material to provide a finely ground tea in the form of a tea powder product in dried form, which is a tea product rich in fats, soluble polysaccharides and tannins, and in potassium, sodium and calcium.

The tea product, constituting a dried and ground powder, comprises about the following detected component content:

| | |
|---|---|
| crude proteins | 7.6% |
| crude fats | 7.4% |
| ash content | 5.0% |
| crude fibers | 16.8% |
| glucides | 49.8% |
| caffeine | not detected |
| tannins | 13.6% |
| potassium | 1731.3 mg% |
| sodium | 837.4 mg% |
| calcium | 592.5 mg% |
| magnesium | 359.0 mg% |
| phosphorus | 186.7 mg% |
| iron | 9.5 mg% |
| copper | 0.5 mg% |
| zinc | 2.7 mg% |
| lead | not detected |
| selenium | 0.9 mg% |

Although production of the instant Eucalyptus tea product is carried out generally in the same manner as the production of green tea, e.g. Gymnema tea and Wulung tea, i.e. except for the distinguishing specific steps in sequence as used according to the present invention, nevertheless, as is clear from the Table 1 comparisons herein, the quantities and distribution of the components in the tea product of the invention are quite different from those of commercially available Gymnema tea and Wulung tea.

Table 2 below, akin to Table 1 above, shows a comparison of the components in raw Eucalyptus leaves before being processed to provide the instant tea product and after such processing per the present invention.

TABLE 2

The Contents of General Chemical Components and Inorganic Components in Raw Eucalyptus Leaves and Eucalyptus Tea (In Dried Form)

| Component | Raw Eucalyptus Leaves | Eucalyptus Tea |
|---|---|---|
| Crude Proteins | 7.8% | 7.6% |
| Crude Fats | 8.7 | 7.4 |
| Ash Content | 4.5 | 4.9 |
| Crude Fibers | 14.7 | 16.8 |
| Carbohydrate | 47.4 | 49.8 |
| Caffeine | 0.1 | ND |
| Tannins | 16.9 | 13.5 |
| Potassium | 701.2 mg% | 1727.6 mg% |
| Sodium | 419.3 | 835.6 |
| Calcium | 1232.3 | 590.8 |
| Magnesium | 310.7 | 395.4 |
| Phosphorus | 269.9 | 186.3 |
| Iron | 16.6 | 9.5 |
| Copper | 0.6 | 0.5 |
| Zinc | 5.5 | 2.7 |
| Lead | ND | ND |
| Selenium | 5.8 | 0.9 |

ND: Not Detected

It is seen that consequent the product ion process, the raw Eucalyptus leaves undergo a change in the percentages of the various components, so that the process steps used govern the percentages of the components in the dried powder product.

Figure 1:
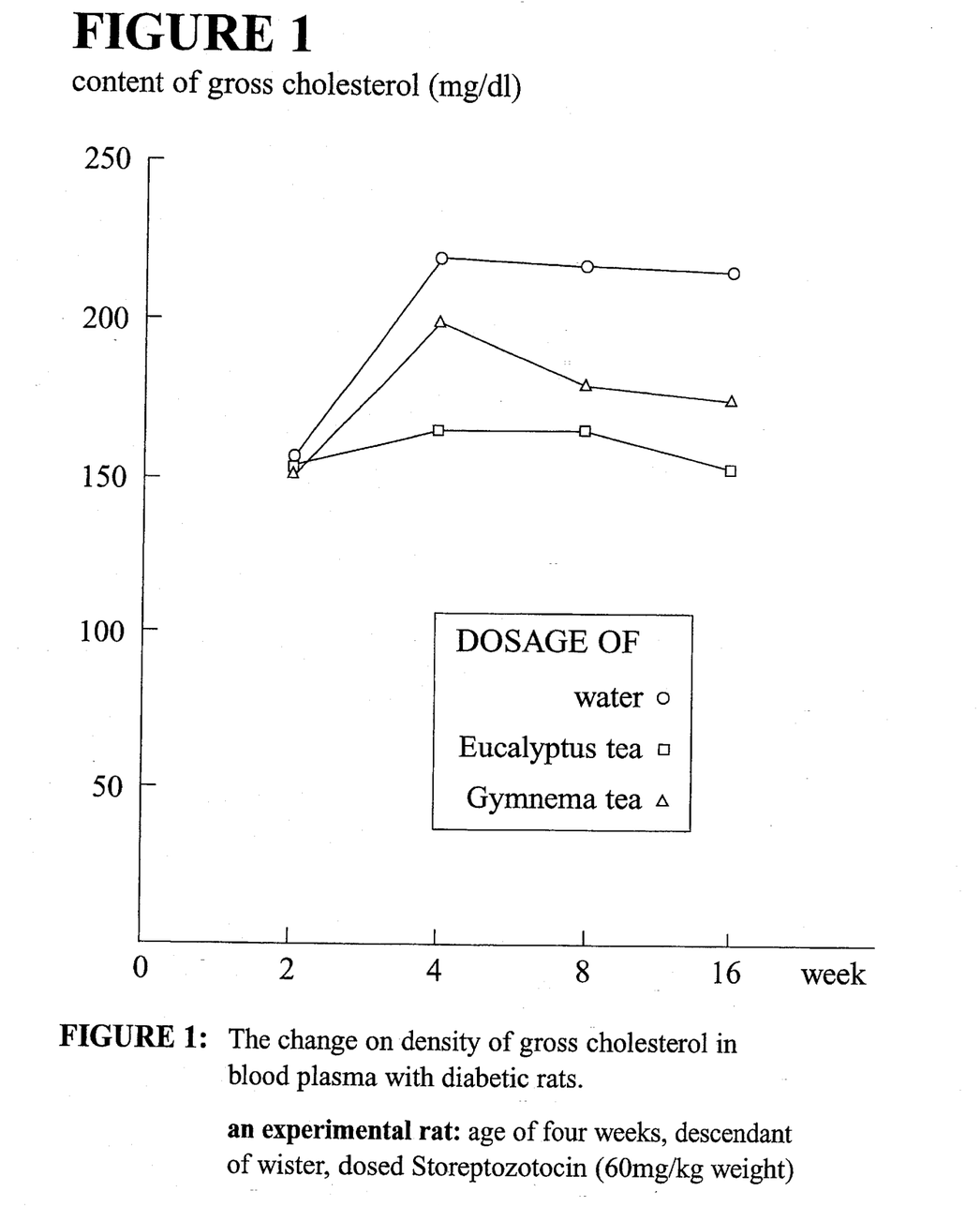
FIG. 1 is a graph comparing the tea product of the invention and Gymnema tea regarding change in gross cholesterol density in blood plasma of diabetic rats.
Figure 2:
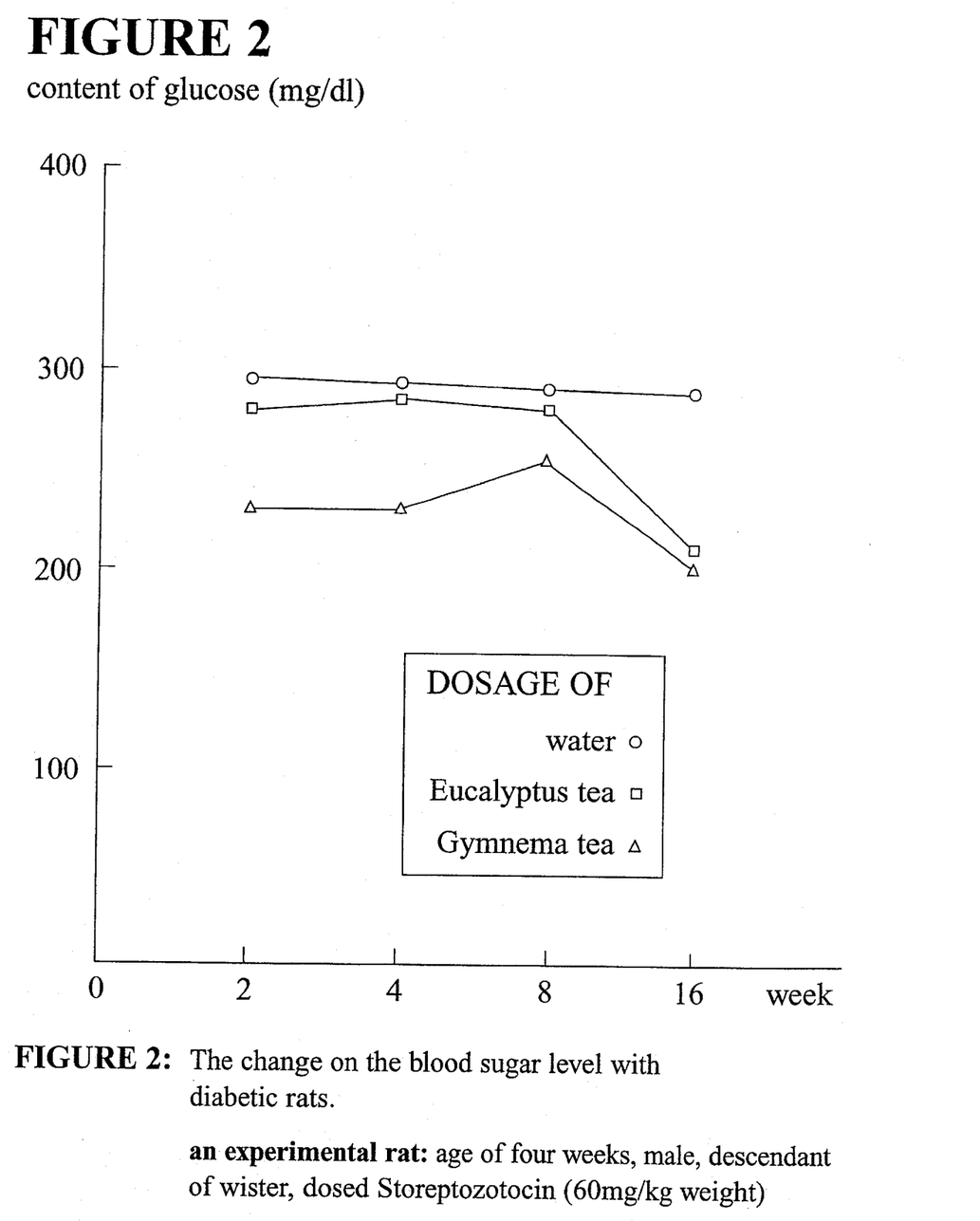
FIG. 2 is a graph comparing the tea product of the invention and Gymnema tea regarding change in blood sugar level of diabetic rats.

FIGS. 1 and 2 are graphs covering results of tests with rats, using the dried form tea product of the invention and Gymnema tea as contemplated in Table 1.

The graph of FIG. 1 shows the change in density (mg/dl) of gross cholesterol in blood plasma over a period of 16 weeks with diabetic rats (experimental rat: age four weeks, descendant of Wister, dosed Storeptozotocin (60 mg/kg weight), using (1) water, (2) the instant Eucalyptus tea and (3) Gymnema tea.

The graph of FIG. 1 shows that the water, Eucalyptus tea and Gymnema tea dosages exert an influence on the density of cholesterol in blood plasma with diabetic rats. Such dosages caused an increase in the numerical value of gross cholesterol until the rats reached the age of four weeks in each experiment. After the fourth week, however, while the dosage of water did not show a remarkable change, the dosages of Eucalyptus tea and Gymnema tea showed a tendency toward decreasing the numerical value of gross cholesterol as the rats grew up. In particular, the experiment with the instant Eucalyptus tea showed the highest effect of restraint on rising cholesterol, thereby demonstrating that the instant Eucalyptus tea has a pronounced effect in restraining the rise in cholesterol in diabetic rats.

The graph of FIG. 2 shows the change in blood sugar level (mg/dl) of glucose over a period of 16 week s with diabetic rats (experimental rat: age four weeks, male, descendant of Wister, dosed Storeptozotocin (60 mg/kg weight), using (1) water, (2) the instant Eucalyptus tea and (3) Gymnema tea.

The graph of FIG. 2 shows that the dosage of the Eucalyptus tea and Gymnema tea exert an influence on the blood sugar level with diabetic rats. The dosage of water scarcely caused a change in the numerical value of the blood sugar level over the course of the experiment. On the other hand, the blood sugar level decreased with the passage of time in the case of the dosages of the Eucalyptus tea and Gymnema tea. At the sixteenth week, the Eucalyptus tea exhibited the lowest level of 190 mg/dl. In particular, the experiment with the instant Eucalyptus tea showed the greatest effect of restraint on rising blood sugar level, thereby demonstrating that the instant Eucalyptus tea has a pronounced effect in restraining the rise in blood sugar level in diabetic rats.

The graphs of FIGS. 1 and 2 cover inherent properties of the instant Eucalyptus tea product and show its more effective performance than the known Gymnema tea for preserving and improving health.

Indeed, the prior art does not teach production of a product containing only Eucalyptus tea (not a tea mixture) and which is rich in fats, soluble polysaccharides and tannins, and in mineral components, especially potassium, calcium, magnesium and phosphorus, that impart beneficial therapeutic qualities to the product in the manner of the invention. Rather, the prior art tea products generally contain poorly soluble polysaccharides, and are low in mineral and other components imparting beneficial therapeutic qualities to the tea product.

According to the present invention the Eucalyptus tea product generally comprises about the following detected component content:

| | |
|---|---|
| crude proteins | at least about 7% |
| crude fats | at least about 7% |
| ash content | at least about 4.5% |
| crude fibers | at least about 16% |
| glucides | at least about 49% |
| caffeine | not detected |
| tannins | at least about 13% |
| potassium | at least about 1700 mg% |
| sodium | at least about 800 mg% |
| calcium | at least about 550 mg% |
| magnesium | at least about 350 mg% |
| phosphorus | at least about 175 mg% |
| iron | at least about 9 mg% |
| copper | at least about 0.4 mg% |
| zinc | at least about 2.5 mg% |
| lead | not detected |
| selenium | at least about 0.8 mg% |

More specifically, the Eucalyptus tea product comprises about the following detected component content:

| | |
|---|---|
| crude proteins | about 8–7% |
| crude fats | about 8–7% |
| ash content | about 4.5–5.5% |
| crude fibers | about 16–17.5% |
| glucides | about 49–50.5% |
| caffeine | not detected |
| tannins | about 14–13% |
| potassium | about 1700–1750 mg% |
| sodium | about 800–850 mg% |
| calcium | about 550–600 mg% |
| magnesium | about 350–400 mg% |
| phosphorus | about 175–200 mg% |
| iron | about 9–15 mg% |
| copper | about 0.4–0.8 mg% |
| zinc | about 2.5–3 mg% |
| lead | not detected |
| selenium | about 0.8–1 mg%. |

In particular, the Eucalyptus tea product comprises about the following detected component content:

| | |
|---|---|
| crude proteins | about 7.6% |
| crude fats | about 7.4% |
| ash content | about 4.9–5.0% |
| crude fibers | about 16.8% |
| glucides | about 49.8% |
| caffeine | not detected |
| tannins | about 13.5–13.6% |
| potassium | about 1727.6–1731.3 mg% |
| sodium | about 835.6–837.4 mg% |
| calcium | about 590.8–592.5 mg% |
| magnesium | about 359.0–395.4 mg% |
| phosphorus | about 186.3–186.7 mg% |
| iron | about 9.5 mg% |
| copper | about 0.5 mg% |
| zinc | about 2.7 mg% |
| lead | not detected |
| selenium | about 0.9 mg%. |

First Processing Embodiment Example

[A] Stem and/or leaf and/or bark portions of raw Eucalyptus, or one or two of them, as the case may be, were shredded into segments or pieces having a length of about 5 to 10 cm.

[B] Such segments were piled to have a thickness of about 10 to 20 cm in a predetermined storage place and left to stand to dry naturally by themselves (self-dry) for about 12 to 15 hours.

[C] Subsequent to such drying process, when a sweet aromatic fragrance began to be emitted or given out, the resultant segments of Eucalyptus were steamed for about 1 to 5 minutes in order to eliminate the characteristic strong raw smell, to destroy and inhibit activation of attendant enzymes and to preserve the green color peculiar to the Eucalyptus.

Then, the resultant Eucalyptus underwent:

[D] a first rubbing process while being compressed (at a temperature of about 90° C. for about 20 minutes),

[E] a second rubbing process while being compressed (at a temperature of about 80° C. for about 20 minutes), and

[F] a third rubbing process while being compressed (at a temperature of about 70° C. to 60° C. for about 20 minutes), thereby evaporating water by an amount of about 50 to 60%.

Subsequently,

[G] a drying process was performed by a combination of hot-air copper-drum rotation drying for evaporating waiter quickly, and then

[H] hot-air shelf drying for achieving gentle and sufficient further drying, finally followed by

[I] copper-drum rotation drying by an open fire (open flame) for producing a stronger sweet aromatic fragrance, thus reducing water to about 3 to 5%.

[J] The resultant Eucalyptus tea was thus produced.

Second Processing Embodiment Example

[AA] Stem and/or leaf and/or bark portions of raw Eucalyptus, or one or two of them, as the case may be, were shredded into segments or pieces having a length of about 5 to 10 cm.

[BB] Such segments were left to stand in a well-ventilated place for about 12 to 15 hours to dry naturally by themselves (self-dry), thereby reducing the water content by an amount of about 10 to 20%.

[CC] Along with the above-mentioned process, the Eucalyptus segments were highly pressurized in order to promote fermentation and to produce a stronger sweet aromatic fragrance and delicate flavor. At the same time, the resultant Eucalyptus segments were compressed to be shredded and dried for about 40 to 60 minutes, thereby reducing the water content by an amount of about 30%. The resultant Eucalyptus segments were thus suitably balanced.

[DD] Subsequently, the resultant Eucalyptus was transferred to a fermentation room and piled horizontally to have a thickness (height) of about 25 to 60 cm so as to be left to stand for about 12 to 15 hours. It was preferable to provide holes (from 5 to 10 cm in diameter) at a height interval of about 30 to 40 cm in order to produce a stronger sweet aromatic fragrance and delicate flavor for the resultant Eucalyptus segments which were horizontally piled.

[EE] The piled segments were than left to ferment.

[FF] At the time when the Eucalyptus started to emit or give out a subtle sweet and cool aromatic fragrance, fermentation was interrupted for about 20 to 30 minutes by copper-drum rotation drying in order to preserve the sweet aromatic fragrance and to eliminate the characteristic strong raw smell of Eucalyptus.

[GG] Furthermore, the resultant Eucalyptus was dried by hot air, and in order to make the aromatic fragrance even stronger, it finally underwent shelf drying and fermentation-interrupting copper-drum rotation drying by an open fire (open flame).

[HH] This was followed by open fire (open flame) drying until the water content was reduced to about 3 to 5%, thereby producing a finally dried Eucalyptus tea product for eventual brewing.

[II] The thus obtained Eucalyptus tea excels in fragrance and flavor, thereby ensuring, upon brewing, a good quality of Eucalyptus tea for enjoying great popularity.

Third Processing Embodiment Example

The finally dried Eucalyptus tea produced in the Second Processing Embodiment Example was crushed into segments having a size of about 50 to 250 mesh. Water was added to such segments of Eucalyptus tea at a ratio of about 1 to 10 parts of water to 1 part of such segments. Then, the thus-diluted Eucalyptus tea was brewed to obtain an Eucalyptus tea liquid stock solution, which was then sterilized for about 10 to 60 minutes at a temperature of about 40° to 60° C. as a prevention against rot or putrefaction. Thus, a sterilized Eucalyptus tea liquid stock solution was obtained.

As will be clear from the foregoing description, the present invention offers the following pertinent advantages regarding the process for producing Eucalyptus tea.

A process for producing Eucalyptus tea is employed whereby stem and/or leaf and/or bark portions of raw Eucalyptus are placed in a room or zone to be left to dry by themselves, and then steamed, thus eliminating the characteristic strong raw smell of Eucalyptus, and thereby destroying and preventing the activation of attendant enzymes. According to such process, the green color inherent in the raw leaves and a potential sweet aromatic fragrance can be preserved. Also, the materials of the Eucalyptus tea are placed in a room or zone to be left to dry by themselves and fermented in a suitable manner so as to provide a good balance of sweet aromatic fragrance and delicate flavor for the resultant Eucalyptus tea, thus obtaining a reliable good quality of Eucalyptus tea. Furthermore, an Eucalyptus essence which is obtainable herein is usable in the form of a liquid, powder or solid which can be provided as a health food which exerts effects on achieving medical purposes, such as fatigue-recovery, promotion of appetite and digestion, prevention of intestinal disorders, and the like.

Overall, the present invention contemplates a process for producing an Eucalyptus tea product made solely from raw Eucalyptus material as distinguished from other type tea material and having a characteristic strong raw smell and a potential sweet aromatic fragrance, comprising the steps in sequence of:

shredding stem and/or leaf portions of raw Eucalyptus only or such stem and/or leaf portions supplemented by bark portions of raw Eucalyptus only to form shredded raw Eucalyptus material only, allowing the shredded raw Eucalyptus material to self-dry in a drying zone for about 12 to 15 hours, steaming the self-dried Eucalyptus material sufficiently to reduce substantially the characteristic strong raw smell of Eucalyptus, and drying the steamed Eucalyptus material by exposure to an open fire sufficiently to eliminate substantially completely the remaining residual characteristic strong raw smell of Eucalyptus and sufficiently to cause the Eucalyptus material to emit a sweet aromatic fragrance, thereby producing the Eucalyptus tea product.

The present invention also contemplates a process for producing a fermented Eucalyptus tea product made solely from raw Eucalyptus material as distinguished from other type tea material and having a characteristic strong raw smell and a potential sweet aromatic fragrance, comprising the steps in sequence of:

shredding stem and/or leaf portions of raw Eucalyptus only or stem and/or leaf portions supplemented by bark portions of raw Eucalyptus only to form shredded raw Eucalyptus material only, allowing the shredded raw Eucalyptus material to self-dry in a drying zone for about 12 to 15 hours, rubbing the self-dried Eucalyptus material under sufficient mechanical squeezing pressure for compressing the Eucalyptus material to reduce the characteristic strong raw smell of Eucalyptus and make stronger a resultant sweet aromatic fragrance thereof, and to reduce selectively the water content of the Eucalyptus material, further shredding the reduced water content Eucalyptus material, placing the further shredded Eucalyptus material in a fermentation zone for about 12 to 15 hours to promote fermentation, interrupting the fermentation by subjecting the Eucalyptus material to drum rotation drying under indirect heat to eliminate substantially completely the remaining residual characteristic strong raw smell of Eucalyptus and make even stronger the sweet aromatic fragrance thereof and enhance the preserving of such fragrance therein, and further drying the resultant Eucalyptus material by exposure to hot air and further by exposure to an open fire sufficiently for improving the aromatic fragrance and flavor thereof, thereby producing the fermented Eucalyptus tea product.

The present invention further contemplates a process for producing an Eucalyptus essence liquid in the form of a sterilized Eucaly tea liquid stock solution, made solely from raw Eucalyptus material as distinguished from other type tea material and having a characteristic strong raw smell and a potential sweet aromatic fragrance, comprising the steps in sequence of:

shredding stem and/or leaf portions of raw Eucalyptus only or stem and/or leaf portions supplemented by bark portions of raw Eucalyptus only to form shredded raw Eucalyptus material only, allowing the shredded raw Eucalyptus material to self-dry in a drying zone for about 12 to 15 hours, rubbing the self-dried Eucalyptus material under sufficient mechanical squeezing pressure for compressing the Eucalyptus material to reduce the characteristic strong raw smell of Eucalyptus and make stronger a resultant sweet aromatic fragrance thereof, and to reduce selectively the water content of the Eucalyptus material, further shredding the reduced water content Eucalyptus material, placing the further shredded Eucalyptus material in a fermentation zone for about 12 to 15 hours to promote fermentation, interrupting the fermentation by subjecting the Eucalyptus material to drum rotation drying under indirect heat to eliminate substantially completely the remaining residual characteristic strong raw smell of Eucalyptus and make even stronger the sweet aromatic fragrance thereof and enhance the preserving of such fragrance therein, and further drying the resultant Eucalyptus material by exposure to hot air and further by exposure to an open fire sufficiently for improving the aromatic fragrance and flavor thereof, thereby producing a fermented Eucalyptus tea product, thereafter crushing the resultant fermented Eucalyptus tea product into dry solid powder particles having a size of from about 50 to 250 mesh, adding water to the dry solid powder particles of Eucalyptus tea at a ratio of about 1 to 10 parts of water per part of the dry solid powder particles to form water diluted Eucalyptus tea, brewing the water diluted Eucalyptus tea, and sterilizing the brewed Eucalyptus tea by heating at a temperature of about 40° to 60° C. to prevent putrefaction, thereby producing an Eucalyptus essence liquid in the form of a sterilized Eucalyptus tea liquid stock solution.

While specific embodiments of the invention have been shown and described in detail to illustrate the application of the principles of the invention, it will be understood that the invention may be embodied otherwise without departing from such principles.

What is claimed is:

1. A process for producing a ground Eucalyptus tea product in dried form, made solely from Eucalyptus material selected from the group consisting of Robsta Eucalyptus (Eucalyptus Robsta Smith) and Lemon Eucalyptus (Eucalyptus Citriodora Hook) the process comprising the steps in sequence of:

steaming raw Eucalyptus material, selected from said Robsta Eucalyptus and said Lemon Eucalyptus, alone by contact thereof with water vapor sufficiently to cause loss of activity of attendant oxidizing enzymes therein and also to cause an increase in softness thereof and thereby forming a steamed Eucalyptus material alone, the steaming being effected at about 100° C. for about 30 seconds, cooling the steamed Eucalyptus material sufficiently rapidly to prevent color and gloss degradation thereof, drying the cooled Eucalyptus material, rumple-twisting the dried Eucalyptus material, further drying the rumple-twisted Eucalyptus material to a moisture content of at most about 5% for increasing long term storage stability, and finely grinding the further dried Eucalyptus material sufficiently to provide a finely ground tea in dried form, said finely ground tea in dried form being rich in fats, soluble polysaccharides and tannins, and in potassium, sodium and calcium, and comprising about the following component content:

| crude proteins | about 8 | 7% |
| crude fats | about 8 | 7% |
| ash content | about 4.5 | 5.5% |
| crude fibers | about 16 | 17.5% |
| glucides | about 49 | 50.5% |
| tannins | about 14 | 13% |
| potassium | about 1700 | 1750 mg % |
| sodium | about 800 | 850 mg % |
| calcium | about 550 | 600 mg % |
| magnesium | about 350 | 400 mg % |
| phosphorus | about 175 | 200 mg % |
| iron | about 9 | 15 mg % |
| copper | about 0.4 | 0.8 mg % |
| zinc | about 2.5 | 3 mg % |
| selenium | about 0.8 | 1 mg %. |

2. A process for producing a ground Eucalyptus tea product in dried form, made solely from Eucalyptus leaves as distinguished form other type tea leaves the process comprising the steps in sequence of:

steaming raw Eucalyptus leaves alone by contact thereof with water vapor sufficiently to cause loss of activity of attendant oxidizing enzymes therein and also to cause loss of activity of attendant oxidizing enzymes therein and also to cause an increase in softness thereof and thereby forming a steamed Eucalyptus material alone, cooling the steamed Eucalyptus material sufficiently rapidly to prevent color and gloss degradation thereof, drying the cooled Eucalyptus material, rumple-twisting the dried Eucalyptus material, further drying the rumple-twisted Eucalyptus material to a moisture content of at most about 5% for increasing long term storage stability, and finely grinding the further dried Eucalyptus material sufficiently to provide a finely ground tea in dried form.

3. The process of claim 2 wherein the steaming step is effected at about 100° C. for about 30 seconds.

4. The process product of claim 2 wherein the Eucalyptus leaves are Robsta Eucalyptus (Eucalyptus Robsta Smith).

5. The process product of claim 2 wherein the Eucalyptus leaves are Lemon Eucalyptus (Eucalyptus Citriodora Hook).

6. A process for producing a ground Eucalyptus tea product in dried form, made solely from Eucalyptus leaves as distinguished from other type tea leaves and selected from the group consisting of Robsta Eucalyptus (Eucalyptus Robsta Smith) and Lemon Eucalyptus (Eucalyptus Citriodora Hook) and by a process comprising the steps in sequence of:

steaming raw Eucalyptus leaves, selected from said Robsta Eucalyptus and said Lemon Eucalyptus leaves, alone by contact thereof with water vapor sufficiently to cause loss of activity of attendant oxidizing enzymes therein and also to cause an increase in softness thereof and thereby forming a steamed Eucalyptus material alone, the steaming being effected at about 100° C. for about 30 seconds, cooling the steamed Eucalyptus material sufficiently rapidly to prevent color and gloss degradation thereof, drying the cooled Eucalyptus material, rumple-twisting the dried Eucalyptus material, further drying the rumple-twisted Eucalyptus material to a moisture content of at most about 5% for increasing long term storage stability, and finely grinding the further dried Eucalyptus material sufficiently to provide a finely ground tea in dried form, said finely ground tea in dried form being rich in fats, soluble polysaccharides and tannins, and in potassium, sodium and calcium, and comprising about the following component content:

| | |
|---|---|
| crude proteins | about 7.6% |
| crude fats | about 7.4% |
| ash content | about 4.9–5.0% |
| crude fibers | about 16.8% |
| glucides | about 49.8% |
| | [not detected] |
| tannins | about 13.5–13.6% |
| potassium | about 1727.6–1731.3 mg% |
| sodium | about 835.6–837.4 mg% |
| calcium | about 590.8–592.5 mg% |
| magnesium | about 359.0–395.4 mg% |
| phosphorus | about 186.3–186.7 mg% |
| iron | about 9.5 mg% |
| copper | about 0.5 mg% |
| zinc | about 2.7 mg% |
| | [not detected] |
| selenium | about 0.9 mg%. |

7. Process for producing an Eucalyptus tea product made solely from raw Eucalyptus material as distinguished from other type tea material and having a characteristic strong raw smell and a potential sweet aromatic fragrance, comprising the steps in sequence of:

shredding raw Eucalyptus material selected from the group comprising leaf portions of raw Eucalyptus, stem portions of raw Eucalyptus, stem and leaf portions of raw Eucalyptus, and stem and leaf portions supplemented by bark portions of raw Eucalyptus to form shredded raw Eucalyptus material only, allowing the shredded raw Eucalyptus material to self-dry in a drying zone for about 12 to 15 hours, steaming the self-dried Eucalyptus material sufficiently to reduce substantially a characteristic strong raw smell of Eucalyptus, and drying the steamed Eucalyptus material by exposure to an open fire sufficiently to eliminate substantially completely a remaining residual characteristic strong raw smell of Eucalyptus and sufficiently to cause the Eucalyptus material to emit a sweet aromatic fragrance, thereby producing the Eucalyptus tea product.

\* \* \* \* \*